US012669425B2

(12) United States Patent
Němeček et al.

(10) Patent No.: US 12,669,425 B2
(45) Date of Patent: Jun. 30, 2026

(54) METHOD OF EVALUATING A SAMPLE USING CHARGED PARTICLE MICROSCOPY

(71) Applicant: FEI Company, Hillsboro, OR (US)

(72) Inventors: Daniel Němeček, Brno (CZ); Sebastian Unger, Houten (NL); Harold Phelippeau, Saint-Jean-de-Linières (FR); Thijs M. J. Bressers, Eindhoven (NL); Steven Milian, Gainesville, FL (US); Laure Kairawicz, Gainesville, FL (US)

( * ) Notice: Subject to any disclaimer, the term of this patent is extended or adjusted under 35 U.S.C. 154(b) by 282 days.

(21) Appl. No.: 18/529,336

(22) Filed: Dec. 5, 2023

(65) Prior Publication Data

US 2024/0183768 A1      Jun. 6, 2024

(30) Foreign Application Priority Data

Dec. 5, 2022    (EP) ..................................... 22211536

(51) Int. Cl.
 G01N 15/06          (2024.01)
(52) U.S. Cl.
 CPC ................................... G01N 15/06 (2013.01)
(58) Field of Classification Search
 CPC ................................................... G01N 15/06
 See application file for complete search history.

(56) References Cited

U.S. PATENT DOCUMENTS

2022/0236163 A1    7/2022  Wystup et al.
2025/0270662 A1*   8/2025  Gleghorn ........... G01N 21/6458

FOREIGN PATENT DOCUMENTS

WO        2022246155 A1    11/2022

OTHER PUBLICATIONS

European Patent Office Search Report for Application No. 22211536, dated Apr. 25, 2023 (7 pages).

* cited by examiner

*Primary Examiner* — Nicole M Ippolito
(74) *Attorney, Agent, or Firm* — Michael Best & Friedrich LLP

(57)          ABSTRACT

The invention relates to a method of evaluating a sample using charged particle microscopy, comprising the steps of a sample containing primary particles of interest. The method further comprises the steps of imaging said sample using said charged particle microscope for obtaining at least one image of said primary particles; and determining a concentration of said primary particles using said at least one image. As defined herein, the sample further contains secondary particles that are independent from said primary particles, and which are present in said at least one image. The method is characterized by the steps of providing a known concentration of said secondary particles and using said known concentration of said secondary particles in said step of determining said concentration of said primary particles.

20 Claims, 9 Drawing Sheets

100

200

300

| | Operator A (300kV, 2.4A) | | | 2.4 |
|---|---|---|---|---|
| | Images | Particles | Std | Titer |
| 100% empty | 260 | 41.6 | 26.9 | 2.15E+13 |
| 100% partial | 252 | 43.7 | 7.0 | 2.26E+13 |
| 100% full | 294 | 40.0 | 9.3 | 2.07E+13 |

| | Operator B (200kV, 1.955A) | | | 1.955 |
|---|---|---|---|---|
| | Images | Particles | Std | Titer |
| 100% empty | 449 | 56.3 | 28.9 | 4.39E+13 |
| 100% partial | 299 | 27.5 | 6.7 | 2.14E+13 |
| 100% full | 333 | 47.5 | 7.1 | 3.70E+13 |

| | Operator C (200kV, 2.257A) | | | 2.257 |
|---|---|---|---|---|
| | Images | Particles | Std | Titer |
| 100% empty | | 40.6 | 10.9 | 2.38E+13 |
| 100% partial | | 18.2 | 4.0 | 1.06E+13 |
| 100% full | | 22.3 | 4.9 | 1.30E+13 |

| | Physical titer | | | |
|---|---|---|---|---|
| | Cryo-EM | | SEC-MALS | ELISA |
| | Min | Max | Mean | Mean |
| 100% empty | 2.15E+13 | 4.39E+13 | 2.03E+13 | 2.38E+13 |
| 100% partial | 1.06E+13 | 2.26E+13 | 1.51E+13 | 1.64E+13 |
| 100% full | 1.30E+13 | 3.70E+13 | 2.02E+13 | 2.07E+13 |

METHOD OF EVALUATING A SAMPLE USING CHARGED PARTICLE MICROSCOPY

CROSS REFERENCE TO RELATED APPLICATIONS

This application claims priority to European Application No. 22211536.2, filed Dec. 5, 2022, the entire contents of which is herein incorporated by reference.

FIELD

The invention relates to a method of evaluating a sample using charged particle microscopy.

SUMMARY

Biology is the natural science that studies life and living organisms, including their physical structure, chemical processes, molecular interactions, physiological mechanisms, development and evolution.

Cell biology is a branch of biology that studies the structure and function of the cell, the basic unit of life. Cell biology is concerned with the physiological properties, metabolic processes, signalling pathways, life cycle, chemical composition and interactions of the cell with their environment. In cell biology, molecular recognition between macromolecules governs all of the most sophisticated processes in cells. The most common macromolecules comprise biopolymers (nucleic acids, proteins, carbohydrates and lipids) and large non-polymeric molecules (such as lipids and macrocycles).

Many researchers are interested in studying macromolecular complexes in their natural environment at high resolution in order to reveal their structural dynamics and interactions. Other areas of interest include drug-cell interaction, or virus biology. Here, particle characterization of produced samples is key for process development of new therapeutics, biologics and antigens, including viral vectors and liposomes that are used as delivery systems for DNA in gene therapy or RNA in vaccines. To study these phenomena, charged particle microscopy may be used.

Charged particle microscopy is a well-known and increasingly important technique for imaging microscopic objects, particularly in the form of electron microscopy (EM). Historically, the basic genus of electron microscope has undergone evolution into a number of well-known apparatus species, such as the Transmission Electron Microscope (TEM), Scanning Electron Microscope (SEM), and Scanning Transmission Electron Microscope (STEM), and also into various sub-species, such as so-called "dual-beam" tools (e.g. a FIB-SEM), which additionally employ a "machining" Focused Ion Beam (FIB), allowing supportive activities such as ion-beam milling or Ion-Beam-Induced Deposition (IBID), for example.

EM provides a number of ways to study biological samples: conventional TEM is used to study gross morphology of biological samples; electron crystallography and single-particle analysis are dedicated to study proteins and macromolecular complexes; and (cryo-)electron tomography and Cryo-EM of vitreous sections (CEMOVIS) are aimed at cellular organelles and molecular architectures. In Cryo-EM and CEMOVIS, samples are preserved by rapid freezing using a vitrification technique, and observed by cryo-TEM. CEMOVIS additionally includes the cryo-sectioning of the sample, which may be done using a cryo-FIB technique.

One of the challenges in these studies is the determination, at a high level of accuracy, of molar concentration and physical titer of particles of interest in solution, such as viral vectors or other drug delivery system.

Traditional methods include the use of latex beads for determination of viral titer by negative staining in TEM, as described, for example, in Monroe, J. H. at al.; Applied Microbiol., 1970, 20: 259 and Malenovska, H. J. Virol. Methods, 2013, 191: 136.

Other methods of determining molar concentration include absorbance techniques for determination of gold nanoparticles, as described in Zuber, A., et al., Sensors and Actuators B, 2016, 227:117.

However, these methods are cumbersome, and the accuracy and ease of use of these known methods can be improved.

Thus, it is an object of the present invention to provide a method of evaluating a sample, with which the concentration of a particle of interest can be determined with improved accuracy, and/or in a more easy and reliable manner.

To this end, the disclosure provides a method of evaluating a sample using a charged particle microscopy as defined in claim 1.

The method comprises the steps of providing a sample containing primary particles of interest; and imaging said sample using a charged particle microscope for obtaining at least one image of said primary particles. The sample may be placed on a sample holder, such as a cryo-EM grid, and may then be placed in a charged particle microscope, such as a cryo-EM. The primary particles of interest may be viral particles, although the disclosure is not limited to these particles.

As defined herein, the method comprises the step of determining a concentration of said primary particles using said at least one image. Thus, the image is used to determine the concentration of the primary particles. This may include determining the concentration of the primary particles based on the number of primary particles in said image, for example based on a counting step of the particles in the image, and then a calculation step based on the counted particles. Both these steps can be done automatically, using image processing techniques or the like (such as conventional, artificial intelligence, or hybrid approaches), or by hand. Using an imaging technique, such as Cryo-EM, has several inherent advantages over other biophysical methods, such as direct visualization of all particles and material in the sample, native sample conditions, and the resolution of molecular details.

Thus, the method as defined herein allows the determination of a concentration of primary particles, wherein use is made of an image to determine the concentration. With this the object as defined herein is achieved.

Advantageous embodiments will be described below.

According to a first aspect, the concentration of said primary particles is determined using volumetric data of said image. The concentration of the primary particles in the image can be determined when the number of particles in the image are known, and when the volume shown in the image is known. The number of particles in the image can be counted, and then be divided by the volume shown in the image.

The volume can be determined based on the physical area of the sample that can be seen in the image (see FIG. 4, indicated with "Area"). This physical area largely depend on the dimensions of the image sensor (number of pixels and pixel size, for example), the magnification settings used by said charged particle microscope, and the thickness of the sample (such as the thickness of the amorphous ice in a cryo-EM sample). Ultimately, one would like to know the physical size of the sample that is collected by a single pixel, or the total physical size of the sample that is collected by the entire sensor. This allows the dimensions of the image to be transformed into a physical area. Knowing the area of each image, the number of particles per image were found to be related to the physical titer of the sample. Within given conditions, the (average) number of particles per image is directly proportional to the physical titer of the original sample that was applied to the grid.

It is conceivable, however, that the thickness of the sample is additionally used in determining the concentration of the primary particles. A thickness of the sample, which may relate to an actual sample thickness or an imaged thickness of the sample (i.e. Depth of Field), can be used to determine the actual volume of the sample (in cubic nanometer or picoliter, for example) that is shown in the image. With the number of primary particles that are visible in the image, and the known volume, the concentration of the primary particles in the image (and hence in the sample) can be calculated in number of particles per volumetric unit (e.g. particles per microliter).

In experiments it was found that the concentration of particles on the sample grid increased, compared to the concentration of the sample that was actually applied to the sample grid. Thus, a (perceived) concentration of the sample took place, potentially caused by the sample grid being electrically charged and binding primary particles onto the surface before the blotting step takes place. This phenomenon will be discussed in greater detail later on. However, this effect can be used in calibration steps, by calculating a concentration factor. This can be done, for example, by calculating the sample thickness that belongs to the known sample concentration (i.e. the sample concentration that was applied to the grid). The calculated sample thickness can be compared to an estimated or calculated sample thickness, with which a measure for the concentration factor is known. This concentration factor can then later be used in other experiments where the sample concentration applied to the grid is unknown.

In an embodiment the thickness of the sample is related to the physical thickness of the sample. In particular, said sample may be a cryo-EM sample, wherein the thickness of the sample is related to the ice thickness of said cryo-EM sample. Ice thickness may be relatively constant from one prepared sample to the next. Ice thickness can be varied using different blotting parameters. Furthermore, ice thickness can be measured, using charged particle microscope or a light tool for example.

According to a second aspect, the concentration of the primary particles is determined using secondary particles. These secondary particles are independent from said primary particles. The secondary particles are independent in that sense that the secondary particles do not bind or otherwise engage with the primary particles. Thus, the secondary particles are non-binding and/or non-engaging to the primary particles. In this embodiment, the secondary particles are visible in the at least one image that is obtained. Thus, the image contains primary particles and secondary particles. The concentration of said secondary particles in said sample is known. The concentration can be determined, or measured for example, when preparing the sample, or a solution with a known concentration can be used during preparation of the sample. Other methods of providing a known concentration are conceivable as well. The provision of this known concentration of secondary particles allows a more accurate and easy determination of said concentration of said primary particles. Thus, the secondary particles act as fiducial particles with which the concentration of the primary particles can be determined.

According to this second aspect, the image obtained by the charged particle microscope contains primary particles and secondary particles. The secondary particles in the sample comprise a known concentration. The number of primary particles and the number of secondary particles can be counted in the image. The ratio of the number of primary particles and the number of secondary particles, together with the known concentration of the secondary particles allows the unknown concentration of the primary particles to be determined.

Advantage of these two aspects for determining the concentration of primary particles is that a single image (containing primary particles according to the first aspect, and additionally containing secondary particles according to the second aspect) can be used for determining the concentration of the primary particles. No further steps or additional techniques, such as negative staining or absorbance techniques, need to be used to accurately determine the concentration of the primary particles.

In both aspects, the method comprises the step of identifying the primary particles in the at least one image. Identification may be done automatically, using computer-aided imaging techniques, or may be done manually. The step of identification may include the categorization of primary particles, for example into one or more sub-categories. This is in particular useful for the counting and characterization of viral particles, for example. The primary particles may be counted, wherein counting may be limited to a certain sub-category. The primary particles may be counted with aid of computer-aided imaging techniques, or may be counted manually.

It is noted that the method according to the first aspect can, in principle, be combined with the method according to the second aspect. This can be used to increase the accuracy of the determined concentration. In particular it was found that use of the first aspect and/or second aspect can give information on any confounders that influence the primary particles during sample preparation. For example, in cryo-EM it was found that the primary particles exhibit a certain affinity with the sample grid, leading to a redistribution of these particles towards the grid (or away, more to the surface of the sample liquid). This may lead to a more concentrated sample at the grid, compared to the concentration at the surface, or vice versa. In cryo-EM, this outer part of the liquid sample is removed by blotting, which means that the measured concentration may be different to the sample concentration initially applied to the sample grid. As explained earlier, the measured concentration can be related to the original concentration or physical titer, using the concentration factor, for example. This will be explained in more detail further on. The use of secondary particles, having a known concentration, allows for a calibration factor to be established. This calibration factor can be used on the primary particles, to establish the concentration of the primary particles in the original sample liquid. Thus volumetric data can be combined with the use of secondary particles with a known concentration, which can be used to establish a calibration factor for the primary particles.

In an embodiment of the second aspect, the method comprises the step of identifying the secondary particles in the at least one image. Identification and counting may be done in a way similar as described with respect to the primary particles.

The secondary particles may in principle be any particle that can be easily identified by either the computer-aided imaging techniques, or manually by a human operator. Examples include latex beads, quantum dots, and gold nanoparticles. It is noted that the distance from the grid in which each type of particle get attracted to the grid might differ per particle type (due to its material properties, size or other parameters). This can be accounted for using the calibration steps as discussed before.

In an embodiment, said secondary particles comprise charged-particle dense material, such as gold nanoparticles or quantum dots. This allows the particles to be highly visible in the at least one image, which enables easier counting of the particles. As indicated previously, counting can be done using computer vision based methods, or by hand.

It is noted that the electron density of the secondary particles can be matched to the electron density of the primary particles. In principle, the primary particles comprise biological material (such as viruses), which are not so electron dense. In that case, it is advantageous when the secondary particles are electron dense, so that they are easily distinguishable from the primary particles. In other cases, however, where the primary particles are electron dense, it will be advantageous to use less electron dense material for the secondary particles.

In an embodiment, wherein use is made of gold fiducial markers as the secondary particles, the method may comprise the use of continuous carbon as support of the sample grid. The continuous carbon assures homogeneous distribution of the gold fiducial markers over the EM grid so that the (local) concentration of the primary particles can be done reliably.

The secondary particles can be used as fiducial markers, in particular as electron-dense fiducial markers. The known concentration of these fiducial markers acts like an internal standard to determine the concentration of an analysed sample from a charged particle image, such as an cryo-EM image.

As described above, the secondary particles are provided with a known concentration in said sample. This may include that the molar concentration of the secondary particles, such as fiducials, is either known already, e.g. from a supplier data sheet, that it is determined by another method, such as measured optical density and known extinction coefficient.

The method may comprise the step of preparing the sample to be evaluated. The step of preparing may comprise the step of providing a solution of the primary particles (such as viral vectors) and of the secondary particles (fiducials). The solution may be provided by mixing primary particles and secondary particles together. The solution of the primary particles and the secondary particles can then be applied to a sample holder, such as an EM grid, after which it can be vitrified. The method may thus comprise the step of vitrifying the solution containing primary particles and secondary particles.

As indicated, a calibration factor can be used to account for changes in the concentration as a result of the sample preparation process and/or sample holder affinity.

In another embodiment, the method comprises the step of applying the solution containing primary particles onto the sample holder, such as the EM grid, after which it can be vitrified. The solution is applied to the sample holder in absence of the secondary particles. The application of the secondary particles is a separate step. In an embodiment, the step of applying the secondary particles (fiducials) onto the sample holder is performed after the vitrification step.

The method may comprise the step of using at least one calibration factor in using the known concentration of the secondary particles for determining the concentration of the primary particles. The relative ratio of the counted secondary particles (e.g. fiducials) and the primary particles (e.g. viral particles) can be used to convert the known concentration of the secondary particles to the concentration (titer) of the primary particles in the analyzed sample, wherein use can be made of the calibration factor. The calibration factor overcomes any possible discrepancy between distribution of the analyzed primary particles (e.g. AAV capsids, AAV=Adeno Associated Virus) and secondary particles (e.g. gold nanoparticles). Use may be made of a calibration curve.

Additionally, the method may comprise a calibration step to adjust for irregular distribution of secondary particles (e.g. fiducial markers) and primary particles (such as viral particles), for example in cryo-EM images.

As used herein, the concentration of primary particles can be expressed either in molar concentration or number of particles per unit volume (such as 1 mL).

In an embodiment, the method comprises the step of determining at least one further parameter of the sample. The obtained image can be used to analyse other sample quality attributes. These sample quality attributes may include doubled particles, agglomerates, broken particles, etc. Thus, in an example, a single cryo-EM image can be used to perform multiplex analysis of several sample quality attributes from the same cryo-EM image dataset.

In an embodiment, the method may comprise the step of modifying the at least one image after the step of counting the secondary particles. The secondary particles can provide a very strong intensity in the at least one image, and this can be replaced with an average density of the micrograph for following image analyses.

Further embodiments are described in the dependent claims.

As discussed, said primary particles may comprise biological particles, such as viral particles.

In an embodiment, the step of determining said concentration of said primary particles comprises the steps of:

determining at least one preliminary concentration of said primary particles; and subsequently determining a final concentration of said primary particles using said provided concentration of said secondary particles.

In an embodiment, a ratio between a number of secondary particles in said at least one image and a number of primary particles in said image is used for determining said concentration of said primary particles.

In an embodiment, the method comprises a calibration step to account for losses of secondary particles during preparation of said sample. The calibration step may also, or alternatively, account for losses or changes in concentration of primary particles during preparation of said sample.

According to an aspect, a charged particle microscope is provided, comprising a processor unit that is arranged for carrying out the method as defined herein.

According to an aspect, a computer-readable storage medium is provided, comprising instructions which, when executed by a computer, causes a charged particle microscope as defined herein to carry out the method as defined herein.

BRIEF DESCRIPTION OF THE DRAWINGS

The invention will now be elucidated in more detail on the basis of exemplary embodiments and the accompanying schematic drawings, in which:

FIG. 5a-c—shows test images and results using an embodiment of the method as described herein;

DETAILED DESCRIPTION

Figure 1:
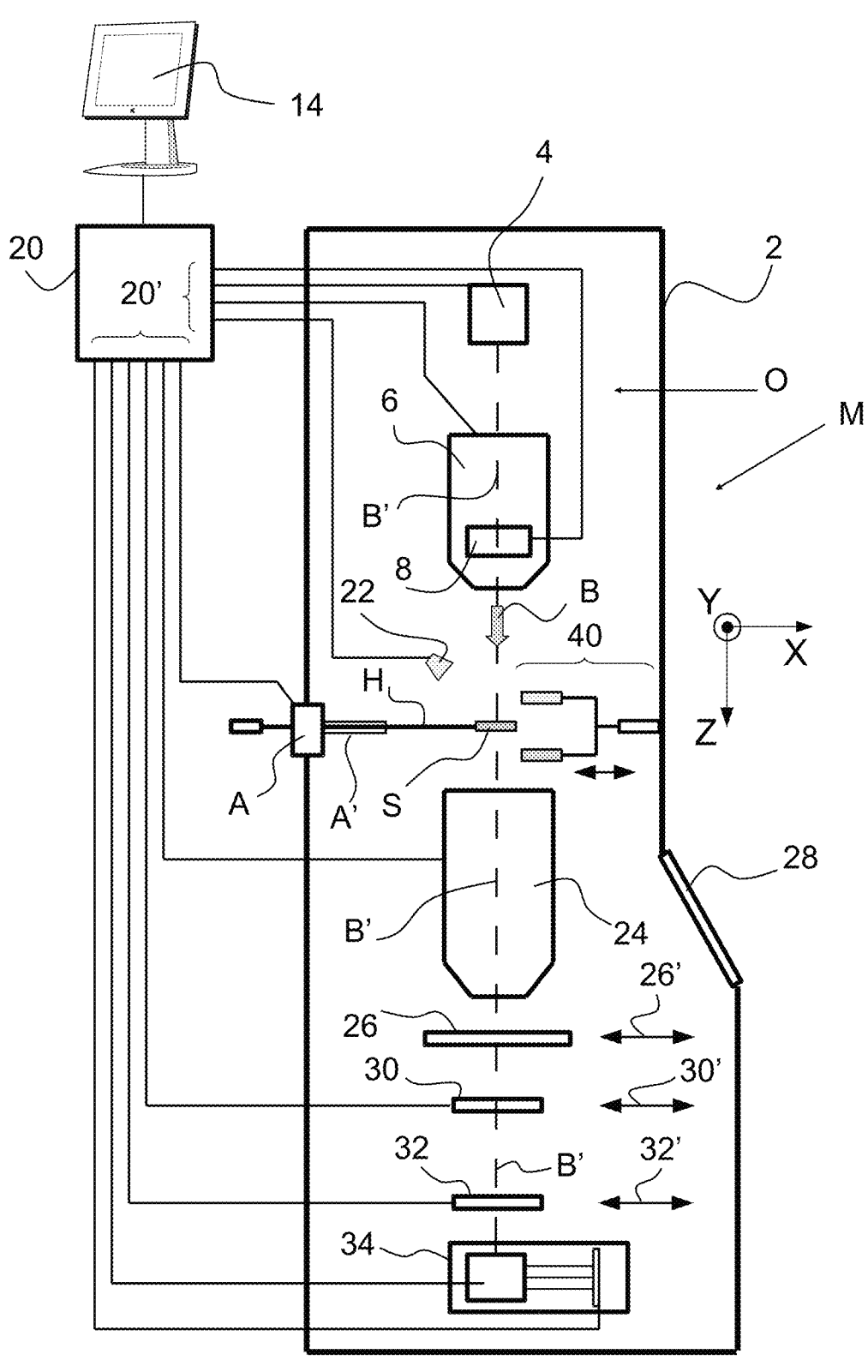
FIG. 1—shows a longitudinal cross-sectional view of a charged particle microscope.

FIG. 1 (not to scale) is a highly schematic depiction of an embodiment of a charged-particle microscope M that can be used in an embodiment of the method according to the invention. More specifically, it shows an embodiment of a transmission-type microscope M, which, in this case, is a TEM/STEM (though, in the context of the current invention, it could just as validly be a SEM (see FIG. 2), or an ion-based microscope, for example). In FIG. 1, within a vacuum enclosure 2, an electron source 4 produces a beam B of electrons that propagates along an electron-optical axis B' and traverses an electron-optical illuminator 6, serving to direct/focus the electrons onto a chosen part of a sample S (which may, for example, be (locally) thinned/planarized). Also depicted is a deflector 8, which (inter alia) can be used to effect scanning motion of the beam B.

The sample S, which in an embodiment is a biological sample containing primary particles of interest, such as viral particles, is held on a sample holder H, in this case a supporting structure in the form of a grid (which is known per se to those skilled in the art), and this sample holder H can be positioned in multiple degrees of freedom by a positioning device/stage A, which moves a cradle A' into which holder H is (removably) affixed; for example, the specimen holder H may comprise a finger that can be moved (inter alia) in the XY plane (see the depicted Cartesian coordinate system; typically, motion parallel to Z and tilt about X/Y will also be possible). Such movement allows different parts of the sample S to be illuminated/imaged/inspected by the electron beam B traveling along axis B' (in the Z direction) (and/or allows scanning motion to be performed, as an alternative to beam scanning). If desired, a cooling device (not depicted, but known to those skilled in the art) can be brought into intimate thermal contact with the sample holder H, so as to maintain it (and the sample S thereupon) at cryogenic temperatures, for example.

The electron beam B will interact with the sample S in such a manner as to cause various types of "stimulated" radiation to emanate from the sample S, including (for example) secondary electrons, backscattered electrons, X-rays and optical radiation (cathodoluminescence). If desired, one or more of these radiation types can be detected with the aid of detector device 22, which might be a combined scintillator/photomultiplier or EDX (Energy-Dispersive X-Ray Spectroscopy) module, for instance; in such a case, an image could be constructed using basically the same principle as in a SEM. However, alternatively or supplementally, one can study electrons that traverse (pass through) the sample S, exit/emanate from it and continue to propagate (substantially, though generally with some deflection/scattering) along axis B'. Such a transmitted electron flux enters an imaging system (projection lens) 24, which will generally comprise a variety of electrostatic/magnetic lenses, deflectors, correctors (such as stigmators), etc. In normal (non-scanning) TEM mode, this imaging system 24 can focus the transmitted electron flux onto a fluorescent screen 26, which, if desired, can be retracted/withdrawn (as schematically indicated by arrows 26') so as to get it out of the way of axis B'. An image (or diffractogram) of at least part of the sample S will be formed by imaging system 24 on screen 26, and this may be viewed through viewing port 28 located in a suitable part of a wall of enclosure 2. The retraction mechanism for screen 26 may, for example, be mechanical and/or electrical in nature, and is not depicted here.

As an alternative to viewing an image on screen 26, one can instead make use of the fact that the depth of focus of the electron flux leaving imaging system 24 is generally quite large (e.g. of the order of 1 meter). Consequently, various other types of analysis apparatus can be used downstream of screen 26, such as:

TEM camera 30. At camera 30, the electron flux can form a static image (or diffractogram) that can be processed by controller/processor 20 and displayed on a display device (not depicted), such as a flat panel display, for example. When not required, camera 30 can be retracted/withdrawn (as schematically indicated by arrows 30') so as to get it out of the way of axis B'.

STEM camera 32. An output from camera 32 can be recorded as a function of (X,Y) scanning position of the beam B on the sample S, and an image can be constructed that is a "map" of output from camera 32 as a function of X, Y. Camera 32 can comprise a single pixel with a diameter of e.g. 20 mm, as opposed to the matrix of pixels characteristically present in camera 30. Moreover, camera 32 will generally have a much higher acquisition rate (e.g. $10^6$ points per second) than camera 30 (e.g. $10^2$ images per second). Once again, when not required, camera 32 can be retracted/withdrawn (as schematically indicated by arrows 32') so as to get it out of the way of axis B' (although such retraction would not be a necessity in the case of a donut-shaped annular dark field camera 32, for example; in such a camera, a central hole would allow flux passage when the camera was not in use).

As an alternative to imaging using cameras 30 or 32, one can also invoke spectroscopic apparatus 34, which could be an EELS module, for example.

It should be noted that the order/location of items 30, 32 and 34 is not strict, and many possible variations are conceivable. For example, spectroscopic apparatus 34 can also be integrated into the imaging system 24.

In the embodiment shown, the microscope M further comprises a retractable X-ray Computed Tomography (CT) module, generally indicated by reference 40. In Computed Tomography (also referred to as tomographic imaging) the source and (diametrically opposed) detector are used to look through the specimen along different lines of sight, so as to acquire penetrative observations of the sample from a variety of perspectives.

Note that the controller (computer processor) 20 is connected to various illustrated components via control lines (buses) 20'. This controller 20 can provide a variety of functions, such as synchronizing actions, providing setpoints, processing signals, performing calculations, and displaying messages/information on a display device (not depicted). Needless to say, the (schematically depicted) controller 20 may be (partially) inside or outside the enclosure 2, and may have a unitary or composite structure, as desired.

The skilled artisan will understand that the interior of the enclosure 2 does not have to be kept at a strict vacuum; for example, in a so-called "Environmental TEM/STEM", a background atmosphere of a given gas is deliberately introduced/maintained within the enclosure 2. The skilled artisan will also understand that, in practice, it may be advantageous to confine the volume of enclosure 2 so that, where possible, it essentially hugs the axis B', taking the form of a small tube (e.g. of the order of 1 cm in diameter) through which the employed electron beam passes, but widening out to accommodate structures such as the source 4, specimen holder H, screen 26, camera 30, camera 32, spectroscopic apparatus 34, etc.

Figure 2A:
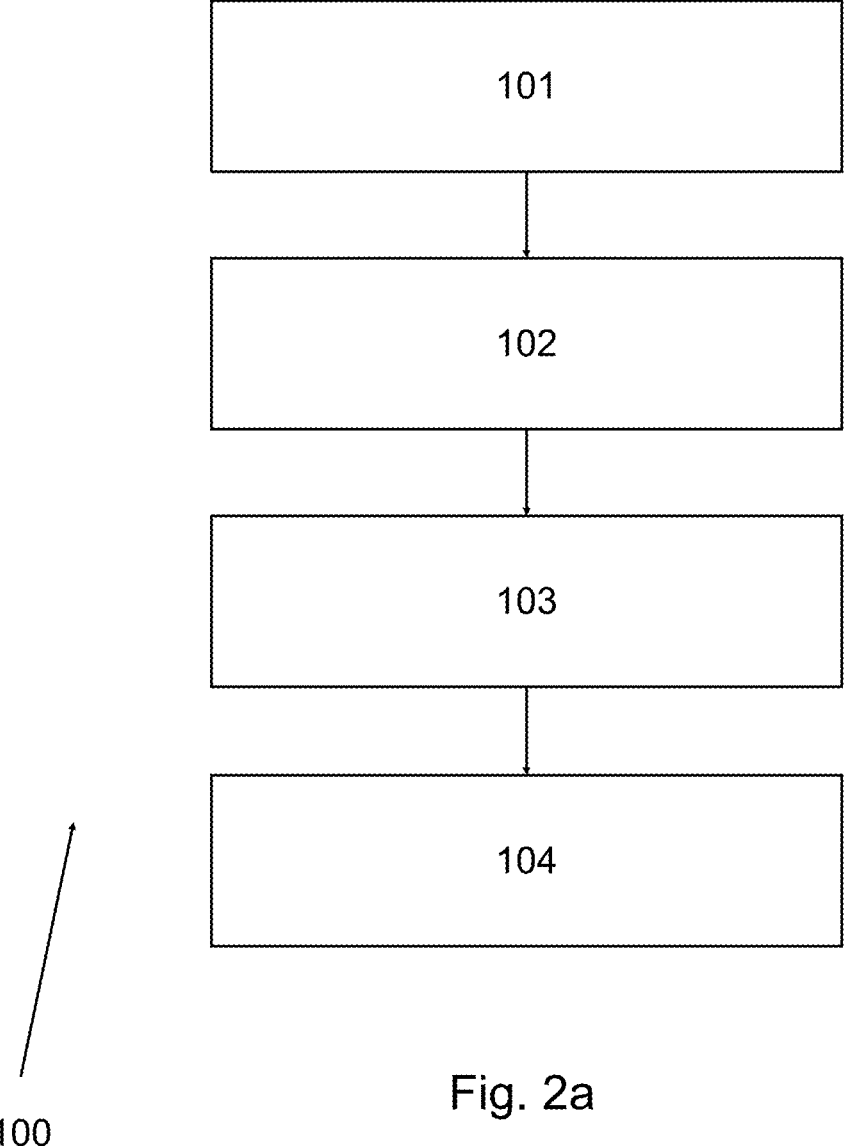
FIG. 2a—shows a block diagram of an embodiment of the method as described herein.

FIG. 2a shows a schematic block overview of an embodiment of the method 100 as described herein, according to a first aspect. As shown, the method 100 comprises the subsequent steps 101-104 of:

providing 101 a sample S containing primary particles P1 of interest;
  imaging 102 said sample S using a charged particle microscope M for obtaining at least one image of said primary particles P1; and
  determining 104 a concentration of said primary particles P1 using said at least one image.

According to the aspect shown in FIG. 2a, the method comprises step 103, which comprises the step of providing volumetric data of said image. As indicated before, the volumetric data of said image can be determined based on image size, a magnification setting of said charged particle microscope, and a thickness of said sample. In particular, the sample can be a cryo-EM sample, wherein the thickness of the sample is related to the ice thickness of said cryo-EM sample. By providing the volumetric data of the sample, the concentration of said primary particles P1 can be determined using the number of particles in the image, divided by the volume shown in the image.

Figure 2B:
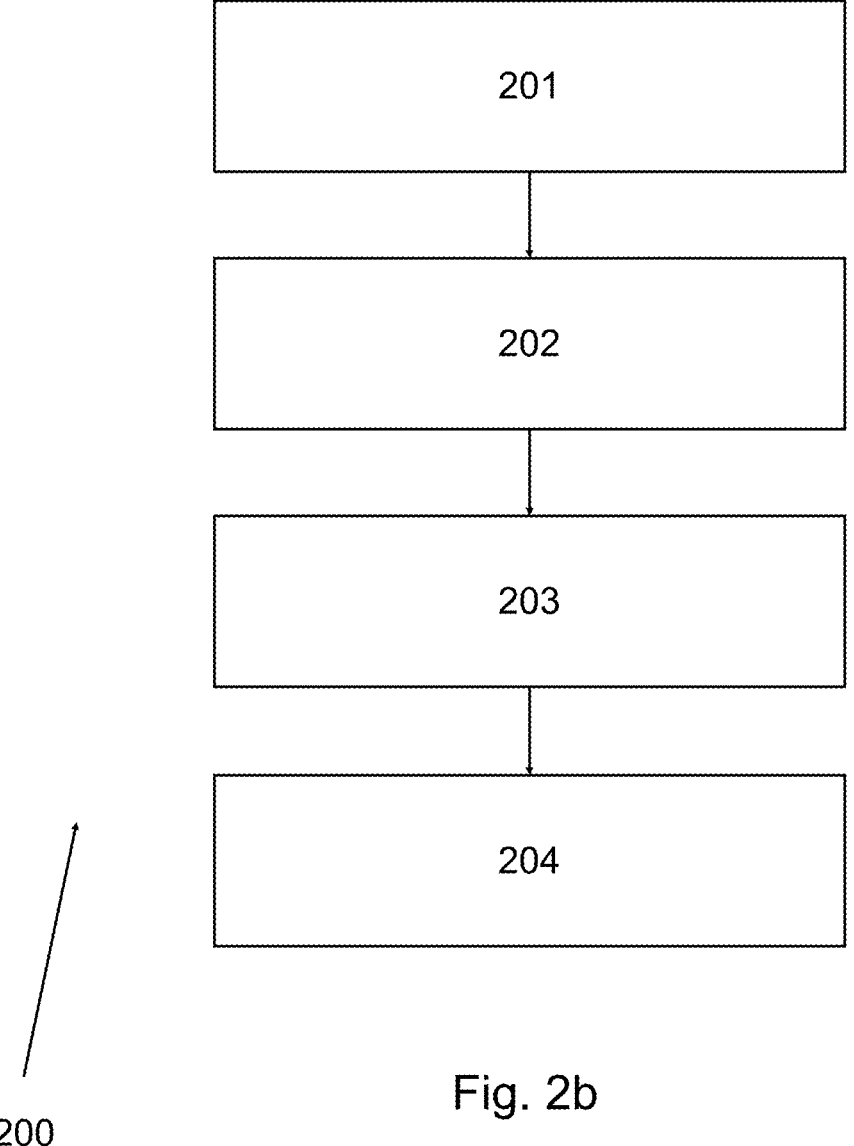
FIG. 2b—shows a block diagram of an embodiment of the method as described herein.

FIG. 2b shows a schematic block overview of an embodiment of the method 200 as described herein, according to a second aspect. As shown, the method 200 comprises the subsequent steps 201-204 of:

providing 201 a sample S containing primary particles P1 of interest;
  imaging 202 said sample S using a charged particle microscope M for obtaining at least one image of said primary particles P1; and
  determining 204 a concentration of said primary particles P1 using said at least one image.

According to the aspect shown in FIG. 2b, the method comprises step 203, which comprises the step of providing a known concentration of secondary particles P2 that are present in said sample and using 203 said known concentration of said secondary particles P2 in said step of determining said concentration of said primary particles P1. It is noted that this step is shown in between step 202 and 204, but in principle this step can be anywhere prior to step 204.

Thus, the two aspects shown in FIGS. 2a and 2b allow the concentration of primary particles to be determined from an image.

Figure 3:
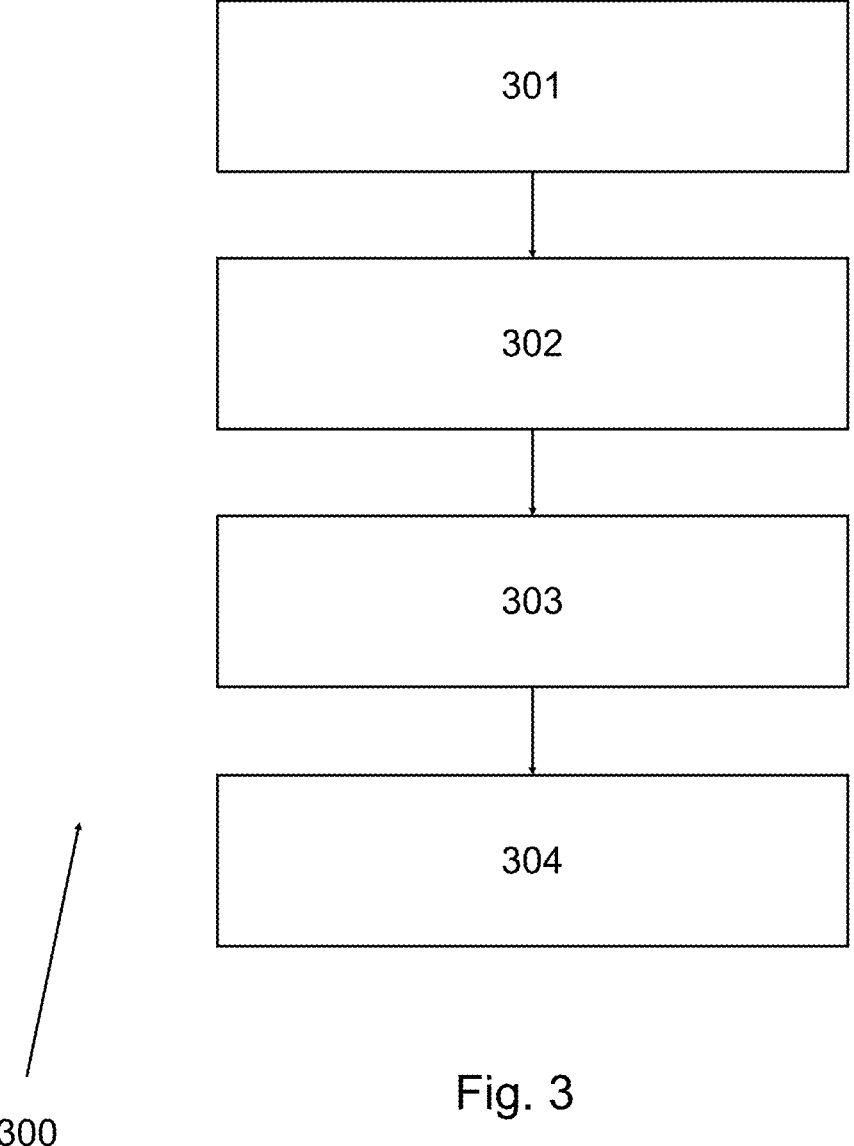
FIG. 3—shows a block diagram of a further embodiment of the method as described herein.

FIG. 3 shows an alternative embodiment of the second aspect of the method as described herein. The method 300 according to this embodiment comprises the steps 301-304 of:

providing a sample S containing primary particles P1 of interest, as well as containing secondary particles P2 that are independent from said primary particles P1;
  imaging 302 said sample S using a charged particle microscope M for obtaining at least one image of said primary particles P1 and said secondary particles P2;
  providing 303 a known concentration of said secondary particles P2; and
  determining 304, using said known concentration of said secondary particles P2, a concentration of said primary particles P1 using said at least one image.

Similar to FIG. 2b, the step 303 of providing a known concentration is shown in between steps 202 and 204, but in principle this step can be anywhere prior to step 204.

FIG. 2b and FIG. 3 show very similar embodiments, wherein use is made of secondary particles P2 that are independent from the primary particles P1 of interest, together with a known concentration of these secondary particles P2, for determining an unknown concentration of the primary particles P1 of interest. These embodiments thus comprise the step of providing the known concentration of the secondary particles P2 for determining the concentration of the primary particles P1, wherein use is made of an image containing said primary particles P1 and secondary particles P2.

Figure 4:
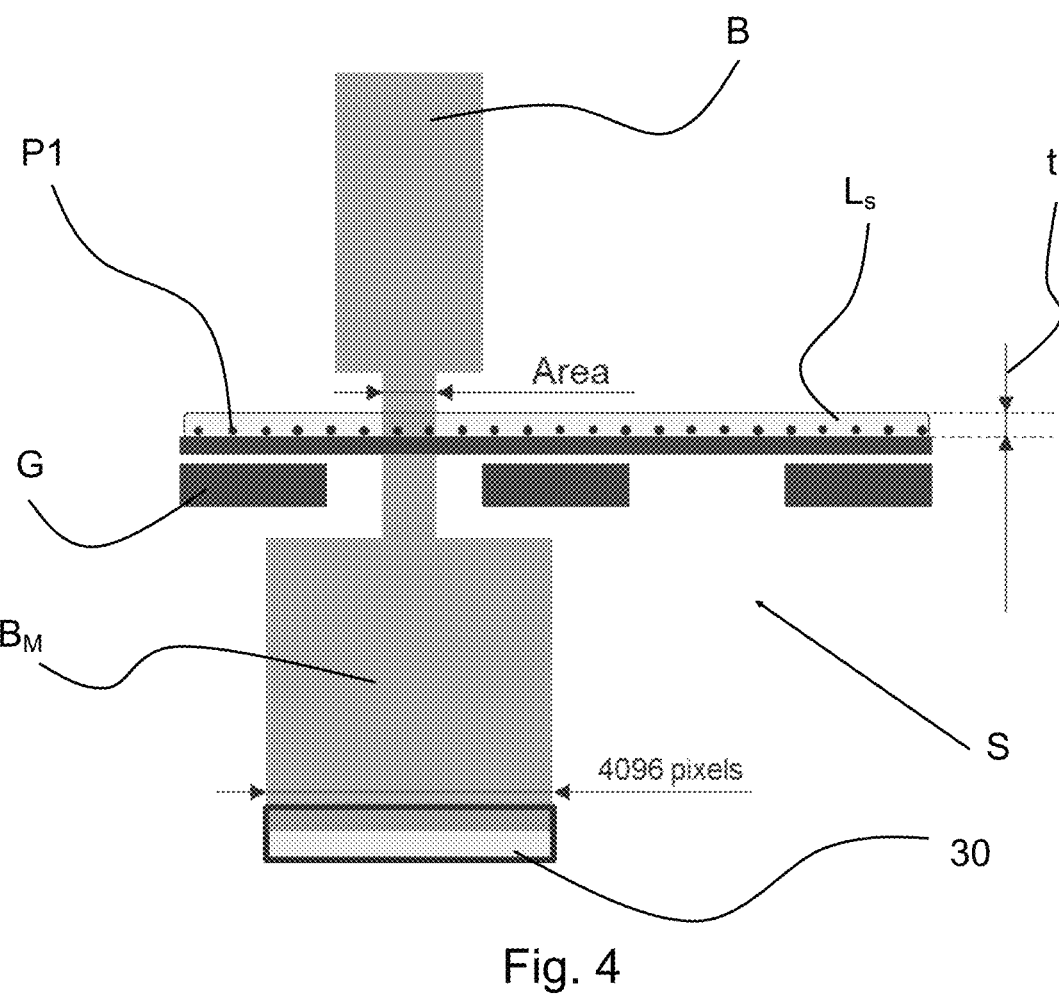
FIG. 4—shows a schematic overview of an embodiment of the method as described herein.

FIG. 4 shows an embodiment according to the first aspect. Here, a side view of the charged particle beam B, the sample S and the detector 30 are schematically shown. The sample S comprises a grid G, with a layer Ls containing primary particles P1 provided on top of the grid G. The layer Ls could be a vitrified liquid having a thickness t, in case of a cryo-EM sample, for example. The beam B can be focused on an area of the sample. Downstream of the sample, the beam can be magnified and focused on the detector 30 (indicated with magnified beam BM).

For calibration purposes the following method can be used. A known particle with a known particle titer (e.g. $2 \cdot 10^{13}$ particles/ml) is provided. The imaged area (indicated with "Area" in FIG. 4) can be determined when the number of pixels and the pixel size is known. The thickness of the sample (ice thickness) can be measured (or approximated at) 40 nm.

The number of particles in the image can be counted, and with this a calibration factor f can be determined:

$$C_{p1} = f * n/V \qquad (1)$$

$$f = C_{p1} * V/n \qquad (2)$$

With $C_{p1}$ the particle titer [parts per m³], f the calibration factor [–], n the number of particles in the sample [parts], and V the volume of the imaged sample [m³].

Inventors found that in some experiments the calibration factor for primary particles P1 (such as virus particles) was equal to 0.01. This indicates that the sample was actually concentrated onto the grid by a factor 100.

Inventors believe that this concentration factor may be constant, or at least can be calibrated for, allowing the physical titer to be determined by cryo-EM without using secondary particles. The key parameters which can influence this concentration or calibration factor in cryo-EM include:

1. Time (from applying the sample to start blotting). As the number of particles stuck to the grid shall decay exponentially, a sufficiently long incubation time (for example 30 seconds) ensures that time is not of influence to the calibration factor;
2. The viscosity and charge of the sample buffer shall typically be constant within practical applications;
3. Particle material properties (weight, size, charge);
4. Amount of charge in the grid, e.g., grid type/batch, glow discharge time, current and grid-position in the glow-discharger;
5. Distance of the particle(s) to the grid.

It is believed that especially this last parameter is key and is determined by the initial particle titer: $f=f(C_{p1})$.

Figure 5A:
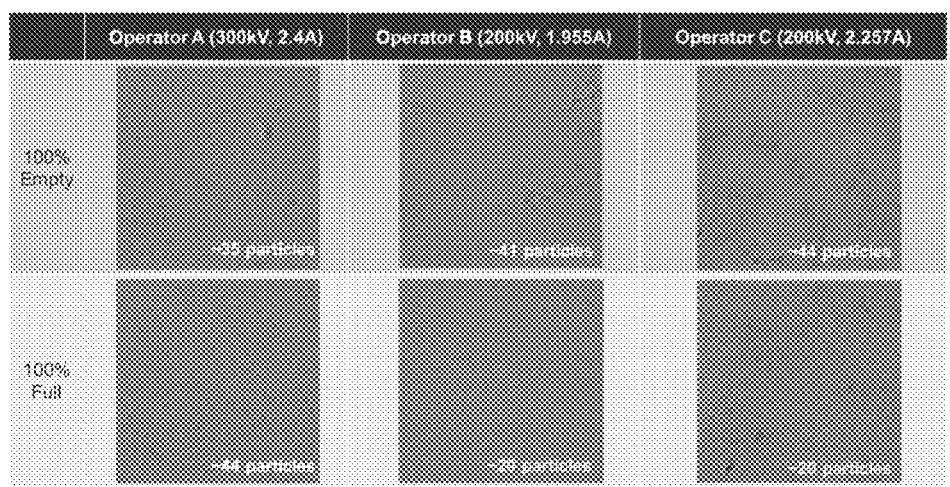

FIG. 5a shows examples of images obtained using the first aspect as disclosed herein. Here, three different operators each imaged one sample having full virus particles, and one sample having empty viral particles. The sample was prepared having a concentration of $2 \cdot 10^{13}$ particles/ml. Taking the calibration factor in account, this should lead to a particle count of 30 in a given image. The three operators were able to give a total particle count ranging in between 20-44, corresponding to a concentration ranging in between $1.3 \cdot 10^{13}$ particles/mml and $2.6 \cdot 10^{13}$ particles/ml. It can be seen that the impact of the above parameters is limited: the calculated physical titer is within 1 order of magnitude from the physical titer as determined upfront. Moreover, it is expected that the particle material properties can be (partially) compensated for by using the information obtained from the micrographs (e.g., size, density). Furthermore, the variation in charge on the grid can be minimized, e.g., by ensuring 1 grid type/batch, 1 glow-discharger/settings and 1 way of positioning the grid in the glow-discharger.

Figure 5C:
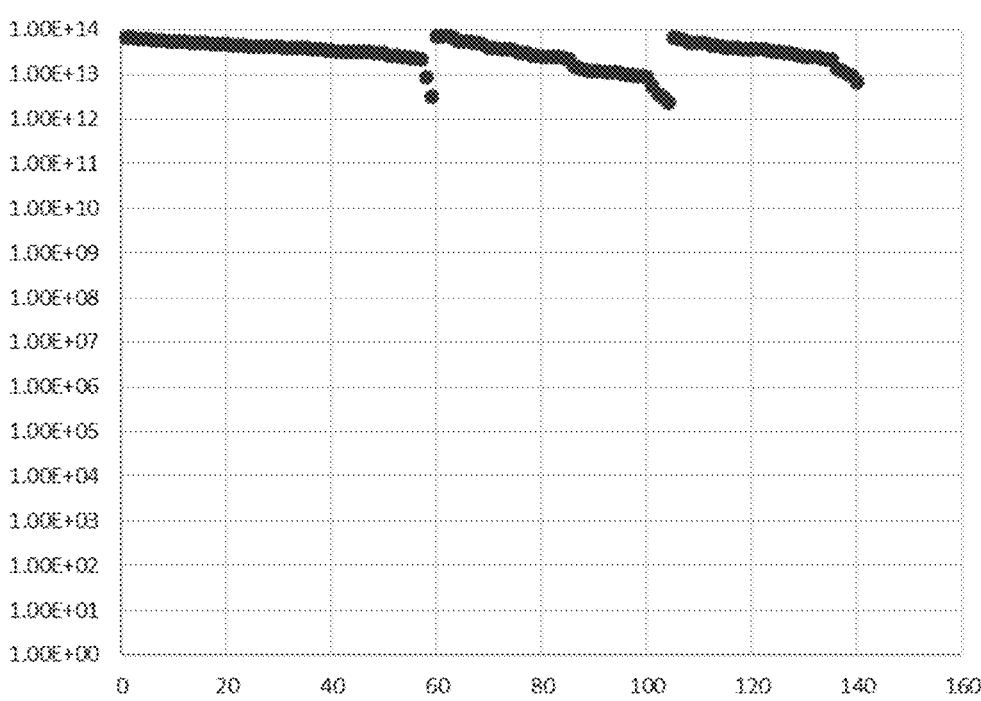

FIGS. 5b and 5c show a full set of initial experiments, where operators determined the concentration of primary particles from different images. FIG. 5b shows summaries for the individual operators, and FIG. 5c shows the individual titer determinations for all three operators. The x-axis in FIG. 5c indicates the number of the experiment, and the y-axis shows the determined titer. It is noted that, for clarification purposes, the x-axis is sorted from highest to lowest titer, for each operator A, C, and B, respectively. For operators A and C, the determined titer was in between $2 \cdot 10^{13}$ particles/ml and $7 \cdot 10^{13}$ particles/ml for 92% of the time (with the actual titer being $2 \cdot 10^{13}$ particles/ml. At present this means that the titer of the primary particles can be indicated within 3-4 time precision. For comparison, traditional methods like SEC-MALS and theoretical physical titer using ELISA are well within 2× precision.

It is noted that the data of the initial experiments, as shown in FIG. 5a-5c, is based on data that was previously acquired. The results of the determination of the titer can be improved by taking into account the key parameters as indicated above, so that a more standardized method of determining the titer is achieved. With this one should be able to reach the accuracy provided by traditional methods.

An exemplary method to determine the physical titer in the original sample can be derived as follows:

1. Glow-discharging. During this step the (cryo) EM grid is charged such that the sample is attracted to the grid in step 2. It is important to note that the electrical current and time chosen to glow-discharge the grid must be chosen such that there is charge-saturation. In experiments we selected a charge of 20 mA with negative polarity for 30 sec, in air. Those skilled in the art will understand that this charge will hold for at least 30 minutes.

2. Applying sample. Here the sample containing the nano-particles is applied to the (cryo) EM grid (e.g., mounted in the Vitrobot™).
3. Incubation time. During this step the nano-particles are attracted and get 'stuck' to the grid. The final number of nano-particles stuck to the grid is determined by the parameters as described above.
4. Blotting. Here, absorbent filter (blotting) paper is pushed into the sample, nearly/partly or fully touching the grid. The absorption/attraction force of the blotting paper is believed to be much less than the attraction force of the charged-grid on the particles.
5. Vitrification. By plunging the sample into (for example) liquid ethane we perform the actual vitrification of the sample. The nano-particles stuck to the grid and the left-over sample-buffer shall be used to acquire the micrographs in the microscope. Note that the vitrification step shall be omitted for non-cryogenic (e.g., negative stain) type of analysis.

In the method above, use can be made of Quantifoil grids with an ultra-thin layer (film) of carbon. It is known that this thin layer improves the distribution of the nano-particles over the grid.

Figure 6:
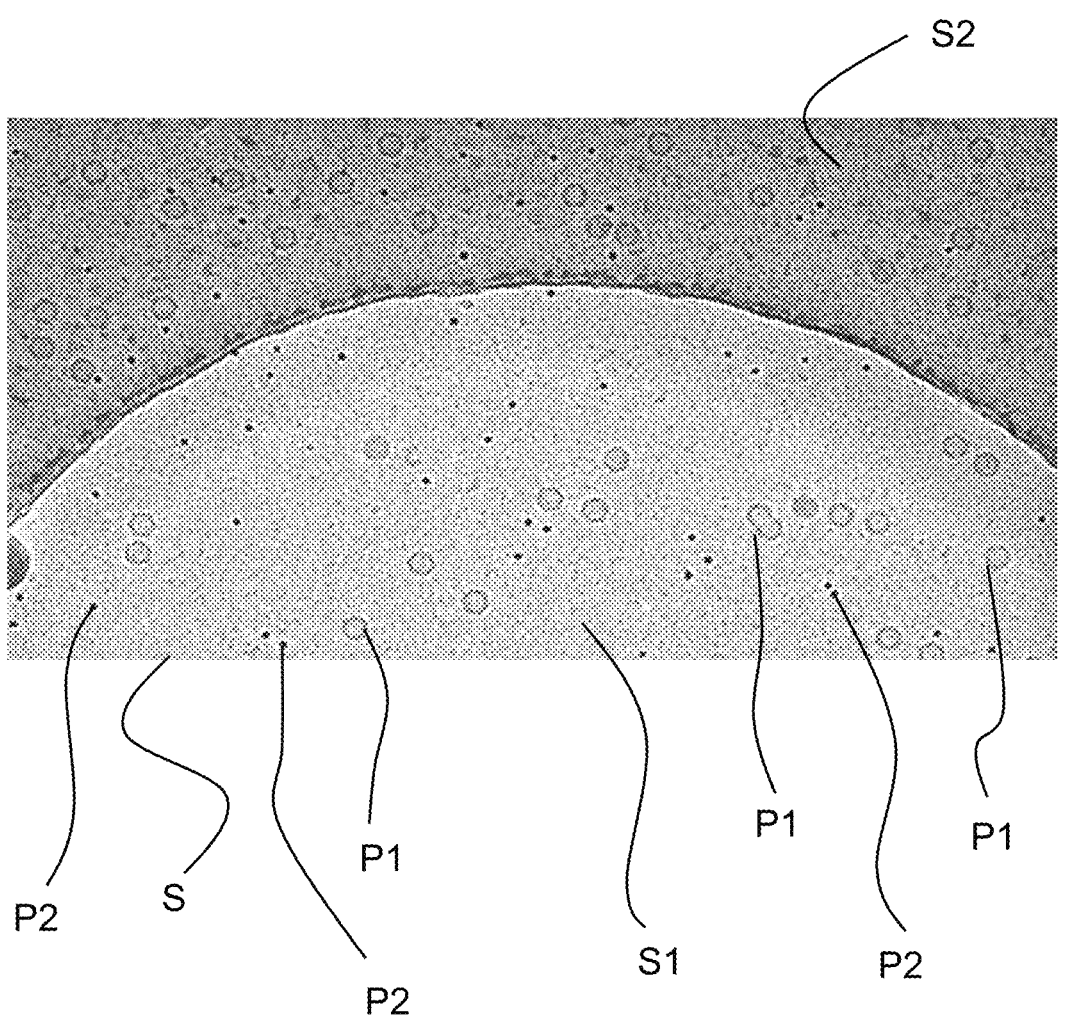
FIG. 6—shows an image obtained with the charged particle microscope of FIG. 1, and for use in the method.

FIG. 6 shows an example of an image obtained using the second aspect of the method as described herein. The image shows a part of the sample S, which in this case is a cryo-EM sample that was prepared on an cryo-EM grid (Quantifoil EM grid, with thin continuous carbon over the holes) using vitrification in a manner that is known to those skilled in the art. The grid of the sample S contains a first part S1 and a second part S2. The first part is a so-called foil-hole, and the second part S2 is a more thick support carbon film that surrounds this foil-hole S1. The sample S contains a number of primary particles P1 and a number of secondary particles P2, which are present in both the first part S1 and the second part S2. The primary particles P1 shown in FIG. 4 are viral particles. For preparing the sample, 5-10 nm gold particles are used as the secondary particles P2. The secondary particles P2 are provided, at a known concentration. In this embodiment, the concentration of gold particles to be added is determined precisely by using an absorption technique at 520 nm, after which it can be mixed in the solution containing the primary particles P1.

The primary particles P1 have an unknown concentration. The primary particles P1 can be counted in the image, yielding a number of primary particles P1 in the image. The secondary particles P2 have a known concentration, since this known concentration is provided during or after the preparation of the sample S. The secondary particles P2 can be counted as well in the image, yielding a number of secondary particles P2 in the image. Now, the number of particles in the image is correlated to the concentration: more particles means there is a higher concentration, and vice versa. This means that the ratio of the secondary particles P2 to the primary particles P1 can be linked to a relative concentration between the two particles. And with the concentration of the secondary particles P2 known, it becomes possible to determine the concentration of the primary particles P1 in the image. It should be noted that a calibration factor (for one or more of the particles) can be used, if necessary.

Knowing the number of primary particles $n_1$ and the number of secondary particles $n_2$, we can calculate the concentration of the primary particles P1 as follows (using equation 1 and 2 above):

$$C_{p1}=f_{p1}*n_1/V \qquad (3)$$

$$C_{p2}=f_{p2}*n_2/V \qquad (4)$$

With combining equation 3 and 4 to remove the volume, and solve for $C_{p1}$, we get:

$$C_{p1} = (f_{p1} * n_1)/(f_{p2} * n_2) \tag{5}$$

Thus, with a calibration factor for both particles (which can be determined beforehand in dedicated controlled experiments) it becomes possible to determine the unknown concentration of a primary particle of interest, provided that a known concentration of secondary particles is added to the sample. It is noted that further calculations may apply, for example when, in preparing the final sample, different volumes of primary particles and secondary particles are mixed to create the final sample. Those skilled in the art will be familiar with these calculations It is possible that only selected particles are counted. For example, it is possible that only particles that are present within a specific area of the sample S are counted, such as the particles that are present in the foil-hole S1. It is furthermore conceivable that particles are counted based on meeting certain physical requirements, which may include size, viability, or other criteria.

In FIG. 6, the primary particles P1 are viral particles (AAV capsids, AAV=Adeno Associated Virus), and the secondary particles P2 are golden nanoparticles. It can be seen that the primary particles are larger than the secondary particles. Although this is advantageous, it is also possible that the primary and secondary particles are similar in size. The secondary particles may also be (slightly) larger than the primary particles. It can be seen that distribution of both the secondary particles and the primary particles (AAV capsids) is similar over holes and over thick support carbon of the EM grid indicating that a calibration curve between the relative ratio of observed particles in images and their concentration in solution can be established.

Figure 7A:
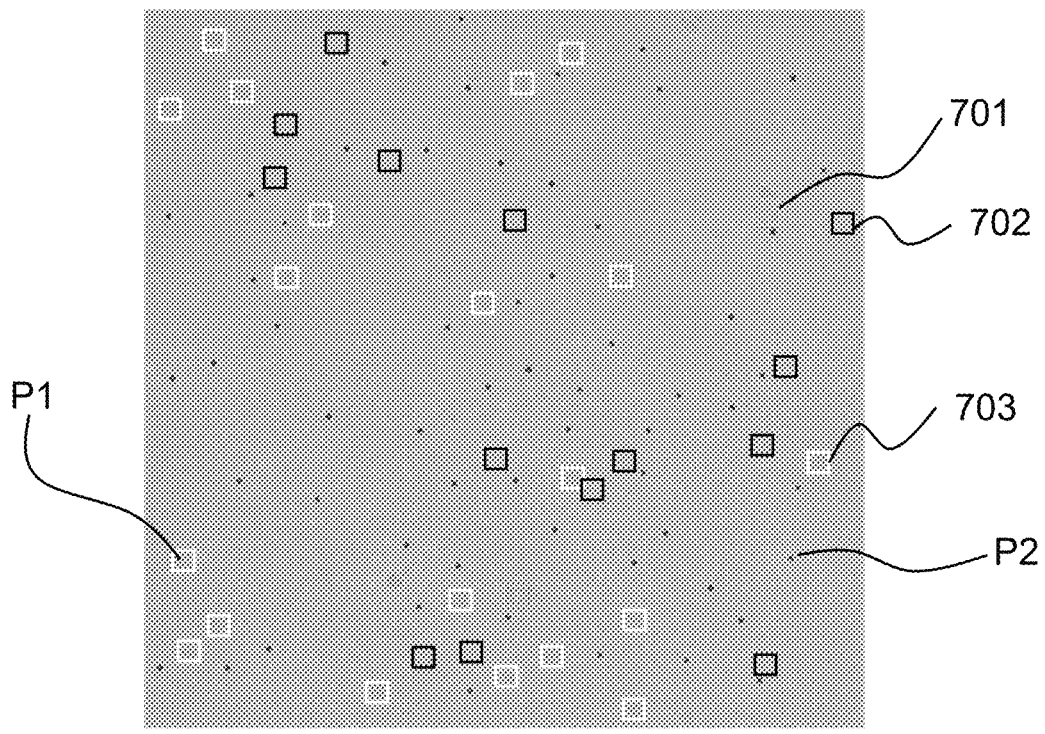
FIGS. 7a and 7b show embodiments of the method as described herein.
Figure 7B:
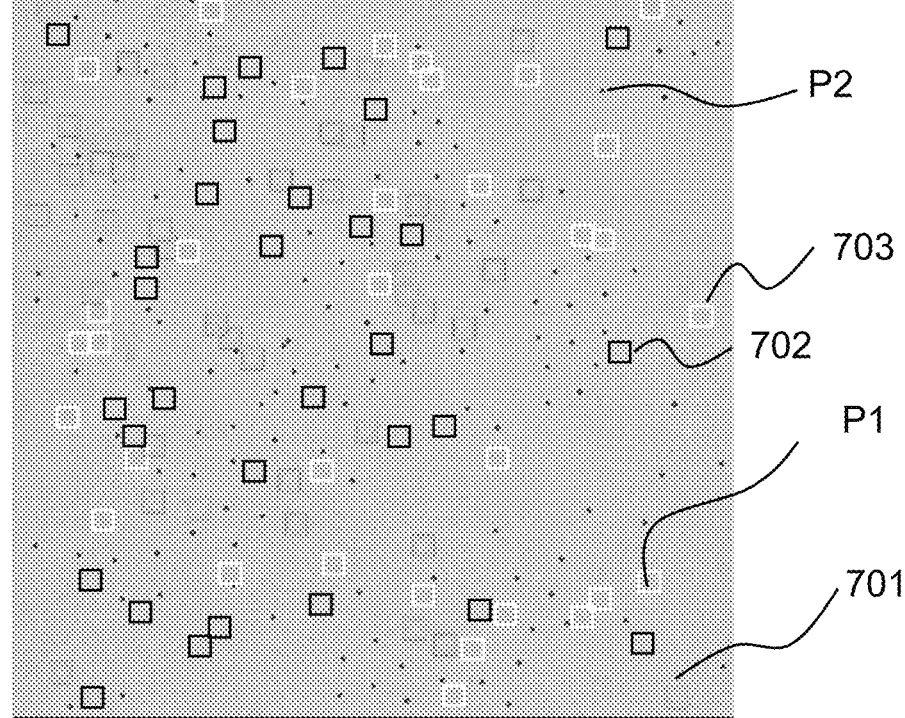

FIGS. 7a and 7b show a further embodiment of the method according to the second aspect, but which could be equally used within the first aspect. Here, the sample contains three different categories of a single virus particle: empty, partial, and full. In the image shown, the AAV capsids are either empty, partially filled, or full. In FIG. 7a a relatively low concentration is used, whereas in FIG. 7b the concentration of particles is relatively high. Particles have been identified using an image recognition algorithm, and particles are classified as empty 701 (grey square), partially filled 702 (black square), or full 703 (white square). Thus, not only the particle count (concentration) can be established, but also other parameters, based on a single image. This multiplex approach is one of the major advantages of the method as disclosed herein.

Embodiments of the invention allow the use of fiducial markers as an internal standard in cryo-EM images for determination of particle titer in solution. Here, the use of continuous carbon over the holes of an EM grid (such as a Quantifoil grid) helps improve the distribution of fiducial markers (secondary particles, such as golden nanoparticles) and sample particles (such as AAV viral particles) over the entire area of the EM grid.

The desired protection is conferred by the appended claims.

The invention claimed is:

1. Method of evaluating a sample using a charged particle microscopy, comprising the steps of:
   providing a sample containing primary particles of interest;
   imaging said sample using a charged particle microscope for obtaining at least one image of said primary particles; and determining a concentration of said primary particles using said at least one image,
   further comprising the step of preparing said sample by
      providing said primary particles and secondary particles in at least one solution,
      providing a sample carrier,
      applying said at least one solution to said sample carrier, and
      vitrifying said solution on said sample carrier.

2. Method according to claim 1, wherein the concentration of said primary particles is determined using the number of primary particles in said image.

3. Method according to claim 1, wherein volumetric data of said image is used in determining said concentration of said primary particles based on at least one or more of the following: image size, a magnification setting of said charged particle microscope, and a thickness of said sample.

4. Method according to claim 3, wherein said sample is a cryo-EM sample, wherein the thickness of the sample is related to the ice thickness of said cryo-EM sample.

5. Method according to claim 1, wherein said image further contains secondary particles that are independent from said primary particles and that have a known concentration, wherein the method further comprises the step of using said known concentration of said secondary particles in said step of determining said concentration of said primary particles.

6. Method according to claim 5, wherein said secondary particles comprise gold nanoparticles.

7. Method according to claim 5, wherein said step of providing said concentration comprises the step of using a supplier data sheet of said secondary particles.

8. Method according to claim 5, further comprising the step of using an absorption technique for providing said concentration of said secondary particles.

9. Method according to claim 5, wherein said step of determining said concentration of said primary particles comprises the steps of:
   determining at least one preliminary concentration of said primary particles; and
   subsequently determining a final concentration of said primary particles using said provided concentration of said secondary particles.

10. Method according to claim 5, wherein a ratio between a number of secondary particles in said at least one image and a number of primary particles in said image is used for determining said concentration of said primary particles.

11. Method according to claim 5, further comprising a calibration step to account for losses of secondary particles during preparation of said sample.

12. Method according to claim 1, wherein said primary particles comprise viral particles.

13. Method according to claim 1, further comprising the step of mixing said primary particles and said secondary particles into a single solution.

14. Method according to claim 1, further comprising the step of determining at least one further parameter of the sample.

15. A charged particle microscope comprising:
   a processor unit configured to:
      provide a sample containing primary particles of interest;
      image said sample using the charged particle microscope for obtaining at least one image of said primary particles; and
      determine a concentration of said primary particles using said at least one image,

wherein volumetric data of said image is used in determining said concentration of said primary particles based on at least one or more of the following: image size, a magnification setting of said charged particle microscope, and a thickness of said sample, and wherein said sample is a cryo-EM sample, wherein the thickness of the sample is related to the ice thickness of said cryo-EM sample.

16. The charged particle microscope of claim 15, wherein the concentration of said primary particles is determined using the number of primary particles in said image.

17. Method of evaluating a sample using a charged particle microscopy, comprising the steps of:

providing a sample containing primary particles of interest;

imaging said sample using a charged particle microscope for obtaining at least one image of said primary particles; and determining a concentration of said primary particles using said at least one image, wherein said image further contains secondary particles that are independent from said primary particles and that have a known concentration, wherein the method further comprises the step of using said known concentration of said secondary particles in said step of determining said concentration of said primary particles, and wherein said step of determining said concentration of said primary particles comprises the steps of:

determining at least one preliminary concentration of said primary particles; and subsequently determining a final concentration of said primary particles using said provided concentration of said secondary particles.

18. Method according to claim 17, wherein volumetric data of said image is used in determining said concentration of said primary particles based on at least one or more of the following: image size, a magnification setting of said charged particle microscope, and a thickness of said sample.

19. Method according to claim 18, wherein said sample is a cryo-EM sample, wherein the thickness of the sample is related to the ice thickness of said cryo-EM sample.

20. Method according to claim 17, wherein said image further contains secondary particles that are independent from said primary particles and that have a known concentration, wherein the method further comprises the step of using said known concentration of said secondary particles in said step of determining said concentration of said primary particles.

\* \* \* \* \*